US007624279B2

(12) United States Patent
Davis et al.

(10) Patent No.: US 7,624,279 B2
(45) Date of Patent: Nov. 24, 2009

(54) SYSTEM AND METHOD FOR SECURE O.S. BOOT FROM PASSWORD-PROTECTED HDD

(75) Inventors: Mark Charles Davis, Durham, NC (US); Randall Scott Springfield, Chapel Hill, NC (US); David Carroll Challener, Raleigh, NC (US); Rod D. Waltermann, Rougemont, NC (US)

(73) Assignee: Lenovo Singapore Pte. Ltd., Singapore (SG)

( * ) Notice: Subject to any disclaimer, the term of this patent is extended or adjusted under 35 U.S.C. 154(b) by 693 days.

(21) Appl. No.: 11/173,738

(22) Filed: Jun. 29, 2005

(65) Prior Publication Data

US 2007/0005951 A1 Jan. 4, 2007

(51) Int. Cl.
*G06F 21/00* (2006.01)
(52) U.S. Cl. .............................. 713/183; 726/17
(58) Field of Classification Search ................ 713/183; 726/17, 18, 19
See application file for complete search history.

(56) References Cited

U.S. PATENT DOCUMENTS

| 4,959,860 | A | | 9/1990 | Watters | 380/4 |
|---|---|---|---|---|---|
| 5,265,163 | A | * | 11/1993 | Golding et al. | 726/19 |
| 5,535,409 | A | * | 7/1996 | Larvoire et al. | 726/28 |
| 5,537,544 | A | * | 7/1996 | Morisawa et al. | 726/19 |
| 5,781,793 | A | * | 7/1998 | Larvoire et al. | 712/37 |
| 5,931,948 | A | * | 8/1999 | Morisawa et al. | 726/19 |
| 6,125,273 | A | * | 9/2000 | Yamagishi | 455/411 |
| 6,138,240 | A | * | 10/2000 | Tran et al. | 726/19 |
| 6,199,163 | B1 | * | 3/2001 | Dumas et al. | 713/183 |
| 6,397,337 | B1 | * | 5/2002 | Garrett et al. | 726/19 |
| 6,415,383 | B1 | * | 7/2002 | Colegrove et al. | 713/2 |
| 6,622,184 | B1 | * | 9/2003 | Tabe et al. | 710/36 |
| 6,871,286 | B1 | * | 3/2005 | Cagle et al. | 726/5 |
| 6,934,881 | B2 | * | 8/2005 | Gold et al. | 714/15 |
| 6,948,075 | B2 | * | 9/2005 | Sasaki et al. | 726/19 |
| 7,210,166 | B2 | * | 4/2007 | Davis et al. | 726/6 |
| 7,240,227 | B2 | * | 7/2007 | Maezawa | 713/300 |
| 7,360,073 | B1 | * | 4/2008 | Billstrom et al. | 713/2 |
| 7,383,575 | B2 | * | 6/2008 | Cheston et al. | 726/16 |
| 7,395,434 | B2 | * | 7/2008 | Piwonka et al. | 713/183 |
| 2002/0091920 | A1 | * | 7/2002 | Sasaki et al. | 713/100 |
| 2003/0149056 | A1 | | 8/2003 | Wissner et al. | 514/256 |
| 2003/0159056 | A1 | | 8/2003 | Cromer | 713/193 |
| 2003/0182584 | A1 | * | 9/2003 | Banes et al. | 713/202 |
| 2003/0208439 | A1 | * | 11/2003 | Rast | 705/38 |
| 2003/0208696 | A1 | * | 11/2003 | Piwonka et al. | 713/202 |
| 2004/0059907 | A1 | * | 3/2004 | Cochran et al. | 713/2 |
| 2004/0088588 | A1 | * | 5/2004 | Awada et al. | 713/202 |
| 2004/0128560 | A1 | | 7/2004 | Challener | 713/202 |
| 2004/0162974 | A1 | * | 8/2004 | Angelo et al. | 713/1 |
| 2004/0268073 | A1 | * | 12/2004 | Morisawa | 711/164 |
| 2006/0036880 | A1 | * | 2/2006 | Maezawa | 713/300 |
| 2006/0075256 | A1 | * | 4/2006 | Hagiwara et al. | 713/186 |
| 2006/0101290 | A1 | * | 5/2006 | Ma | 713/300 |
| 2006/0112420 | A1 | * | 5/2006 | Challener et al. | 726/5 |
| 2007/0040678 | A1 | * | 2/2007 | Kojo | 340/568.1 |

* cited by examiner

*Primary Examiner*—David García Cervetti
(74) *Attorney, Agent, or Firm*—Rogitz & Associates

(57) ABSTRACT

If a user forgets the power-on password of his computer, he can depress the "enter" key or "access" key once to cause the BIOS to locate the power-on password in memory and attempt to unlock the HDD using the power-on password to boot a secure O.S. The HDD password either can be the same as the power-on password or the HDD can recognize the power-on password for the limited purpose of allowing access to the secure O.S. In any case, the secure O.S. is booted for password reset.

21 Claims, 2 Drawing Sheets

SYSTEM AND METHOD FOR SECURE O.S. BOOT FROM PASSWORD-PROTECTED HDD

I. FIELD OF THE INVENTION

The present invention relates generally to booting operating systems in computers.

II. BACKGROUND OF THE INVENTION

When a personal computer is turned on, a basic input-output system (BIOS) that is stored in non-volatile solid state memory of the computer is invoked to begin what is known as a "boot" process, in which various initialization chores are undertaken. Among the most important of these chores is the copying of an operating system from disk storage of the computer over into typically a volatile solid state memory of the computer, for execution of the operating system by the processor of the computer when the computer is being used. When the computer is turned off or when it is "re-booted", the operating system is flushed from the memory. By executing the operating system from the relatively fast memory instead of from the disk, computer operations are accelerated.

Among the chores of booting is to prompt the user to enter a password, so that use of the computer is enabled. This password is sometimes referred to as the "power-on password. Without proper password entry, the use of the operating system is denied. Additionally, the hard disk drive (HDD) of the computer may have its own password, so that even when the power-on password is properly entered, access to the HDD is denied unless the HDD password is also input.

Recognizing that users can forget their passwords, a limited operating system, referred to herein as a "secure operating system" (also sometimes referred to in the art as a "service O.S."), may be provided to the user to undertake limited, "safe" tasks. That is, a "secure" operating system is configured to accomplish only predetermined limited tasks, and because of this the secure O.S. cannot feasibly be corrupted or infected with malicious code. Also, this O.S. is not suitable for other "productive" uses of the computer, so the end user cannot accomplish other work using it. One of these limited tasks may be to issue a challenge question to the user, which, if correctly answered, enables the user to reset the power-on password and, hence, to boot the standard O.S. The secure O.S., like the standard O.S., must be booted.

The present invention recognizes that a secure O.S. can be booted from an optical disk in an optical disk drive or from a remote storage over a network, but that the most convenient way to boot the secure O.S. would be from the HDD, for both speed and minimal user action. As critically understood herein, however, the HDD, which may itself be protected by a password, may not grant access to the secure O.S. unless the HDD password is remembered. On the other hand, recall that one purpose of a secure O.S. is to allow limited computer functionality when a user forgets a password, including that of the HDD. With the above conundrum in mind, the present invention is provided.

SUMMARY OF THE INVENTION

The present invention uses a power-on password to unlock a hard disk drive (HDD) only for the purpose of booting, from the HDD, a secure O.S.

Accordingly, a method for booting a computer with a secure O.S. includes, in lieu of an power-on password, receiving a key signal from an input device operatively connected to the computer. In non-limiting embodiments the key signal can be generated by pushing an "access" button on a computer or by pushing the "enter" button or other special button during booting.

In any case, in response to the key signal and without further user interaction, a basic input/output system (BIOS) in the computer is executed to retrieve from a memory associated with the computer the power-on password. If a hard disk drive (HDD) associated with the computer is locked with a HDD password, the method sends the power-on password to the HDD to attempt to at least conditionally unlock the HDD. The method then includes booting a secure O.S. from the HDD if the power-on password unlocks the HDD.

In non-limiting embodiments the key signal is generated by one and only one press of a single input element on the input device. The HDD password may be the same as the power-on password, or the HDD password may be different from the power-on password, in which case the HDD can be programmed to recognize the power-on password only for the conditional purpose of granting access to the secure O.S.

If desired, if the HDD is not unlocked by the power-on password, an optical disk associated with the computer, or a network associated with the computer, can be accessed to obtain a boot copy of the secure O.S. The secure O.S. may be located on the HDD using a logical block address (LBA) in a master boot record (MBR) sector of the HDD.

Various roll-out scenarios are facilitated using present principles. For example, the key signal can be generated upon initial use of the computer as indication of the user agreeing to register the computer. Or, the computer can be automatically registered to the user at a vendor facility and the power-on password can be set to a random value at the vendor facility, and the key signal is subsequently generated by the user during initial (first time) boot to reset the power-on password to a user-defined value. Yet again, the power-on password may be set to a random value at a vendor facility and a supervisor password associated with the BIOS may be set to a registration value at the vendor facility. An attempt to reset the power-on password by generating the key signal and booting the secure O.S. will fail, at which point a registration mode can be entered. Or, the power-on password can be set to a random value at a vendor facility and a supervisor password associated with the BIOS is cleared at the vendor facility. A registration bit may be set to "register" to cause booting of the secure O.S. in a registration mode in response to an initial generation of the key signal by the user.

In another aspect, a computer is disclosed that can be booted with a secure O.S. The computer includes a key signal generating element on an input device of the computer. The key signal generating element generates a key signal when a user manipulates it once and only once during a BIOS boot sequence. Logic is provided that is implemented in the computer for, in response to the key signal and without further user interaction, retrieving from a memory associated in the computer an power-on password. Also, logic that is implemented in the computer sends the power-on password to the HDD. Logic is also provided for booting a secure O.S. from the HDD if the power-on password unlocks the HDD.

In still another aspect, a computer booting system includes means for generating a signal by manipulating an input element, and means for, in response to the signal, automatically retrieving an power-on password from memory of a computer. The signal represents a value different from the password, i.e., the signal is not a user input of the password, but rather is an indication of a user wishing to enter a secure mode. Means are also provided for sending the power-on password to a HDD to permit access to a secure O.S. on the HDD. Means may then be invoked for booting the secure O.S. from the HDD.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
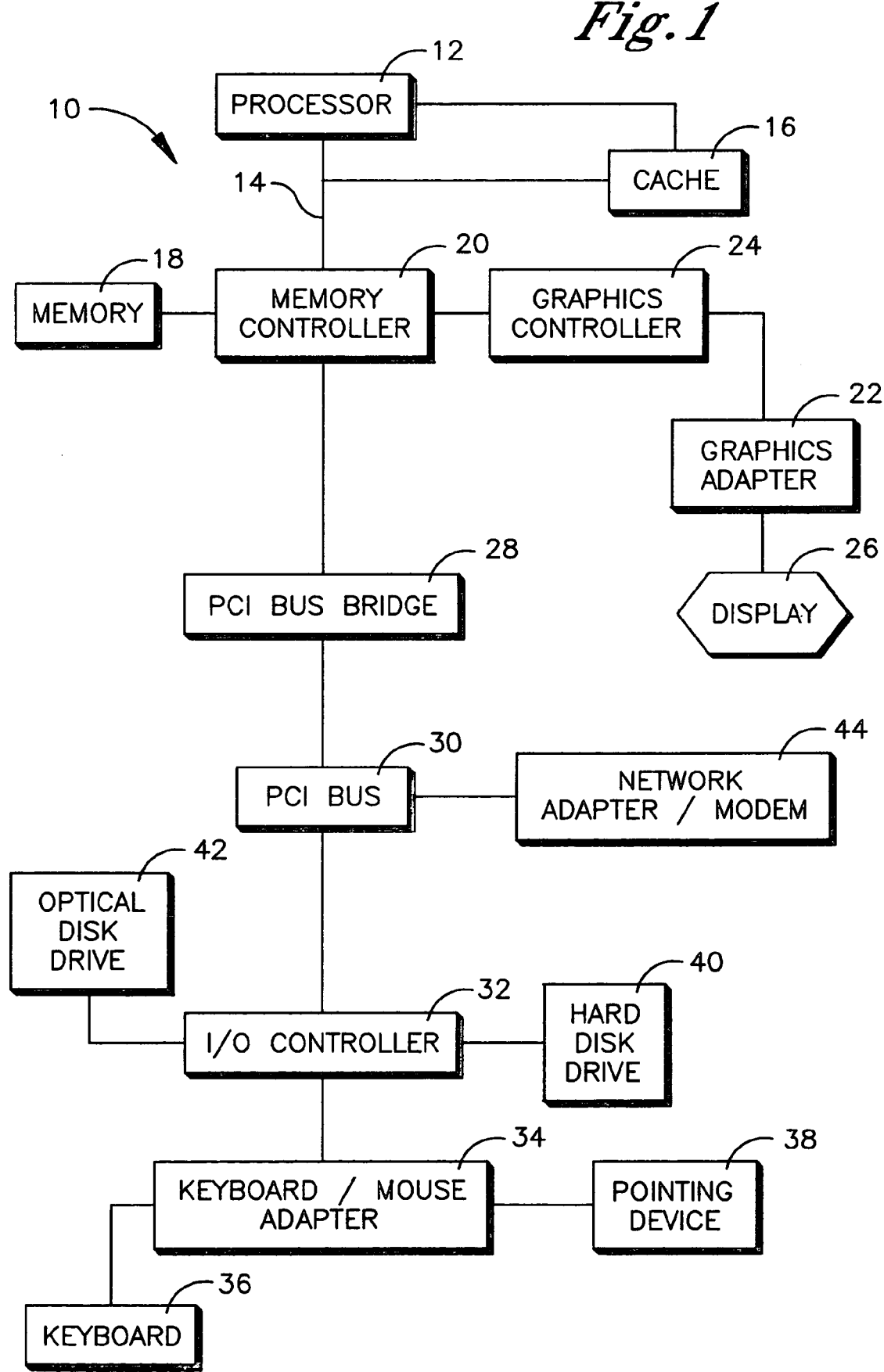
FIG. 1 is a block diagram of a non-limiting computer that can use the present invention.

Referring initially to FIG. 1, a high-level block diagram of a data processing system, generally designated 10, is shown in which the present invention may be implemented. The system 10 in one non-limiting embodiment is a personal computer or laptop computer. The system 10 includes a processor 12, which may be, without limitation, a PowerPC processor available from International Business Machines Corporation of Armonk, N.Y. (or other processors made by, e.g., Intel or AMD and common to the industry). The processor 12 is connected to a processor bus 14, and a cache 16, which is used to stage data to and from the processor 12 at reduced access latency, is also connected to the processor bus 14. In non-limiting embodiments the processor 12 can access data from the cache 16 or from a system solid state memory 18 by way of a memory controller function 20. Also, the memory controller 20 is connected to a memory-mapped graphics adapter 22 by way of a graphic bus controller 24, and the graphics adapter 22 provides a connection for a monitor 26 on which the user interface of software executed within data processing system 10 is displayed.

The non-limiting memory controller 20 may also be connected to a personal computer interface (PCI) bus bridge 28, which provides an interface to a PCI bus 30. Connected to the PCI bus 30 may be an input/output (I/O) controller 32 for controlling various I/O devices, including, e.g., a keyboard/mouse adapter 34 which provides connection to a keyboard 36 and to a pointing device 38, which may be implemented by a mouse, trackball, or the like. Additionally, a hard disk drive 40 is connected to the I/O controller 32. If desired, an optical disk drive 42, such as a DVD or CD drive, can be connected to the I/O controller 32. In some implementations a network adapter 44 can be attached to the PCI bus 30 as shown for connecting the data processing system 10 to a local area network (LAN), the Internet, or both. In any case, in accordance with principles known in the art, during power-on the processor 12 executes a basic input/output system (BIOS) program that may be stored in the memory 18, to load an operating system in the hard disk drive 40 into the memory 18.

Figure 2:
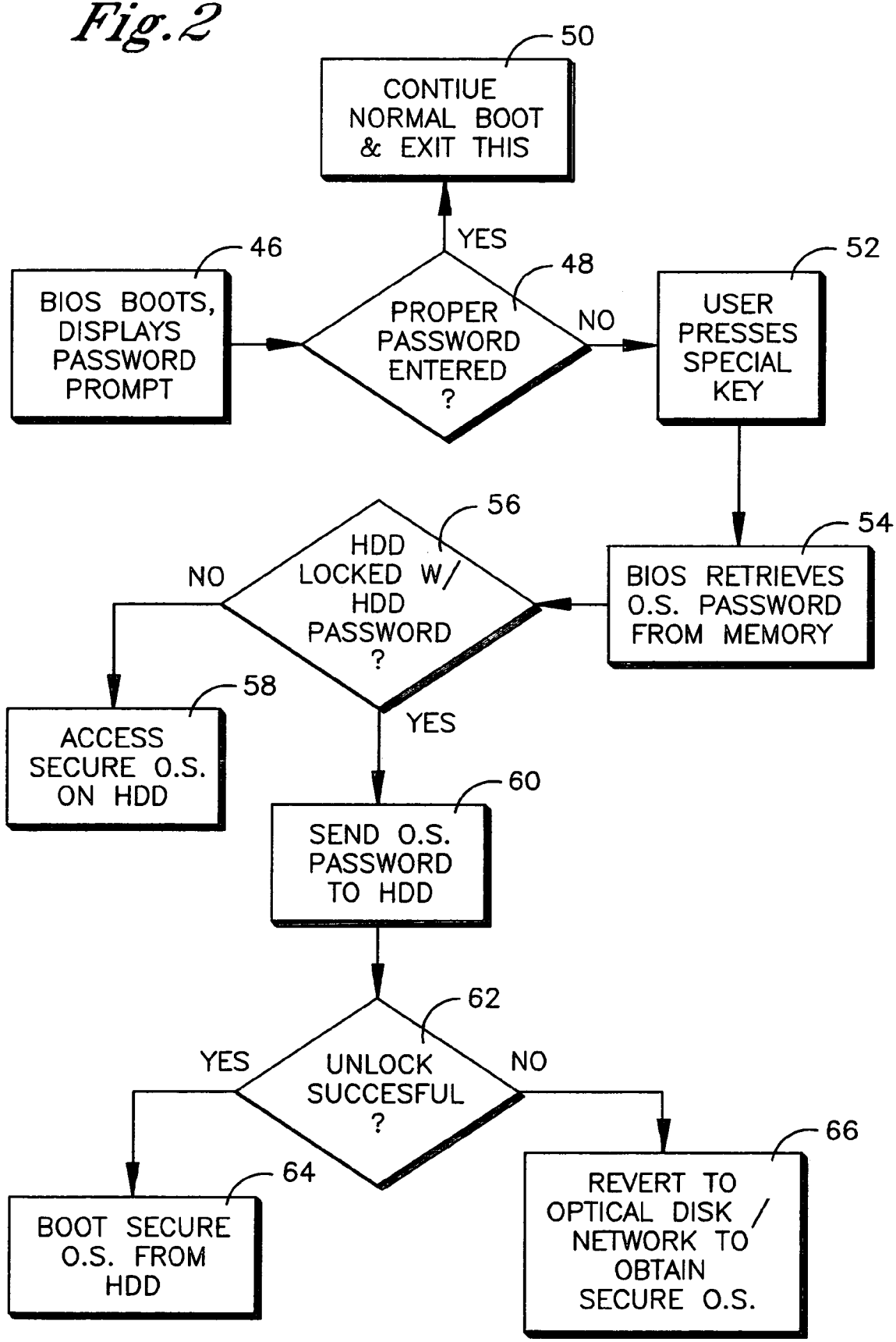
FIG. 2 is flow chart of a non-limiting implementation of the present logic.

Now referring to FIG. 2, the present logic can be seen in non-limiting flow chart format, it being understood that the actual logic may be implemented in state form or other suitable form. Commencing at block 46, at power on the processor 12 shown in FIG. 1 executes the BIOS to begin booting, during which a prompt is displayed for the user to enter an power-on password. If the power-on password is correct at decision diamond 48, the logic continues normal booting at block 50, wherein the present logic is exited and the standard operating system on the HDD is booted.

On the other hand, if the correct power-on password is not determined to have been entered at decision diamond 48, the logic moves to block 52 to receive a key signal that is generated by the user by depressing a special key. In preferred embodiments the special key, which can be the blue "access" key on some computers such as IBM's "Thinkpad" computer or the "enter" key on other computers, is pressed once and only once to generate the key signal.

In response, the logic moves to block 54, wherein the BIOS is executed to retrieve the power-on password from solid state memory in, e.g., a trusted platform module of the computer, or in the non-volatile memory, or in CMOS, etc. If, at decision diamond 56, it is determined that the HDD is not locked with an HDD password, the logic accesses the secure O.S. on the HDD at block 58 and subsequently operates in accordance with secure O.S. procedures known in the art. On the other hand, when the HDD is protected by an HDD password, the logic flows to block 60 to send the power-on password to the HDD.

The power-on password will either be successful or not in unlocking the HDD. In one non-limiting implementation, the power-on password and HDD password are the same, in which case providing the power-on password to the HDD unlocks the HDD for access to the secure O.S. In other implementations, the HDD password and the power-on password are different, and the HDD is programmed to recognize the power-on password only for the purpose of granting access to the secure O.S.

In any case, when the HDD is successfully unlocked at decision diamond 62, the secure O.S. is booted from the HDD to the computer at block 64. The secure O.S. may then be used for various purposes known in the art, such as resetting the power-on password in response to a successful reply to a challenge. In contrast, if the HDD cannot be unlocked at decision diamond 62, alternate sources of the secure O.S. are accessed at block 66. For instance, the BIOS may be executed to locate the secure O.S. on an optical disk in the optical drive 42 (FIG. 1), or on a network over the modem 44 (FIG. 1). The network can be accessed using the "preboot execution environment" (PXE) function of the BIOS.

With the above logic, the present invention may be implemented without the need for new storage locations or configuration bits.

In addition, the above logic can be used to facilitate "roll out" scenarios, i.e., to facilitate initial use actions such as user registration. For example, generation of the key signal upon initial use of the computer can indicate the user agreeing to register the computer. In this scenario, a flag bit can be set to indicate offerer registration is implemented. The end user agrees to a registration message presented by BIOS before the password prompt by generating the key signal as described above, and the logic executes as described to boot a secure O.S. and thus enable initial setting of an power-on password as well as implementation of registration functions.

In a second scenario, the computer is automatically pre-registered to the user at a vendor facility and the power-on password is set to a random value at the vendor facility. The key signal is generated by the user at initial power-on to boot the secure O.S. such that the power-on password may be reset to a user-defined value.

In a third scenario, the power-on password is set to a random value at a vendor facility and a supervisor password associated with the BIOS is set to a registration value at the vendor facility. In this scenario, an attempt to reset the power-on password by generating the key signal and booting the secure O.S. will fail because the supervisory password input by the user will be incorrect. As is known in the art, the supervisory password may be required to operate BIOS or to reset the power-on password using the secure O.S. In either case, upon the above-described failure the logic can enter a registration mode, which the user must enter before being given permission to proceed further.

In a fourth roll-out scenario, the power-on password is set to a random value at a vendor facility and a supervisor password associated with the BIOS is cleared at the vendor facility. A registration bit is set to "register" to cause booting of the secure O.S. in a registration mode in response to an initial generation of the key signal by the user.

In non-limiting implementations, the secure O.S. may be placed in a separate partition on the HDD. If partitions prove to be scarce resources, the secure O.S. can be made part of the rescue and recovery (RnR) image, or it can be stored in a service partition.

Further to non-limiting limitations, to enable BIOS to locate the secure O.S. on the disk, one of the master boot records (MBR) sectors on the HDD can contain a special signature and the logical block address (LBA) of the secure O.S., so that the secure O.S. could be embedded in the RnR boot manager and still be located. The secure O.S. can thus be located using the information in the MBR.

Additionally, if desired the BIOS-accessible CMOS memory in the computer can have a bit that when set means "encourage the power-on password and HDD password to be the same." When this bit is set, the BIOS can display an error message any time the power-on password and HDD passwords are changed so they don't agree. As an alternative, the power-on password and HDD password are forced to always be the same, so that changing either the HDD password or power-on password will cause the other password automatically to be changed as well.

While the particular SYSTEM AND METHOD FOR SECURE O.S. BOOT FROM PASSWORD-PROTECTED HDD as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". For example, instead of a tactilely-manipulated "access" or other button on a keyboard, the present key signal can be generated when a user "manipulates" a voice recognition input device by, e.g., speaking the word "access". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for booting a computer with a secure operating system (O.S.), comprising:
    in lieu of a power-on password, receiving a key signal from an input device operatively connected to the computer;
    in response to the key signal and without further user interaction, executing a basic input output system (BIOS) in the computer to retrieve from a memory associated with the computer the power-on password;
    if a hard disk drive (HDD) associated with the computer is locked with a HDD password, sending the power-on password to the HDD to attempt to at least conditionally unlock the HDD; and
    booting a secure O.S. from the HDD if the power-on password at least conditionally unlocks the HDD, wherein the key signal is generated by one and only one press of a single input element on the input device.

2. The method of claim 1, wherein the input element is an "enter" key on a computer keyboard.

3. The method of claim 1, wherein the input element is an "access" key on a computer keyboard.

4. A method for booting a computer with a secure operating system (O.S.), comprising:
    in lieu of a power-on password, receiving a key signal from an input device operatively connected to the computer;
    in response to the key signal and without further user interaction, executing a basic input output system (BIOS) in the computer to retrieve from a memory associated with the computer the power-on password;
    if a hard disk drive (HDD) associated with the computer is locked with a HDD password, sending the power-on password to the HDD to attempt to at least conditionally unlock the HDD; and
    booting a secure O.S. from the HDD if the power-on password at least conditionally unlocks the HDD, wherein the HDD password is different from the power-on password, and the HDD recognizes the power-on password only for the purpose of granting access to the secure O.S.

5. A method for booting a computer with a secure operating system (O.S.), comprising:
    in lieu of a power-on password, receiving a key signal from an input device operatively connected to the computer;
    in response to the key signal and without further user interaction, executing a basic input output system (BIOS) in the computer to retrieve from a memory associated with the computer the power-on password;
    if a hard disk drive (HDD) associated with the computer is locked with a HDD password, sending the power-on password to the HDD to attempt to at least conditionally unlock the HDD; and
    booting a secure O.S. from the HDD if the power-on password at least conditionally unlocks the HDD, wherein the HDD password is the same as the power-on password, with access to the HDD being granted upon reception of the power-on password.

6. A method for booting a computer with a secure operating system (O.S.), comprising:
    in lieu of a power-on password, receiving a key signal from an input device operatively connected to the computer;
    in response to the key signal and without further user interaction, executing a basic input output system (BIOS) in the computer to retrieve from a memory associated with the computer the power-on password;
    if a hard disk drive (HDD) associated with the computer is locked with a HDD password, sending the power-on password to the HDD to attempt to at least conditionally unlock the HDD; and
    booting a secure O.S. from the HDD if the power-on password at least conditionally unlocks the HDD, wherein if the HDD is not at least conditionally unlocked by the power-on password, at least one of: an optical disk associated with the computer, or a network associated with the computer, is accessed to obtain a boot copy of the secure O.S.

7. A method for booting a computer with a secure operating system (O.S.), comprising:
   in lieu of a power-on password, receiving a key signal from an input device operatively connected to the computer;
   in response to the key signal and without further user interaction, executing a basic input output system (BIOS) in the computer to retrieve from a memory associated with the computer the power-on password;
   if a hard disk drive (HDD) associated with the computer is locked with a HDD password, sending the power-on password to the HDD to attempt to at least conditionally unlock the HDD; and
   booting a secure O.S. from the HDD if the power-on password at least conditionally unlocks the HDD, wherein the secure O.S. is located on the HDD using at least a logical block address (LBA) in a master boot record (MBR) sector.

8. A method for booting a computer with a secure operating system (O.S.), comprising:
   in lieu of a power-on password, receiving a key signal from an input device operatively connected to the computer;
   in response to the key signal and without further user interaction, executing a basic input output system (BIOS) in the computer to retrieve from a memory associated with the computer the power-on password;
   if a hard disk drive (HDD) associated with the computer is locked with a HDD password, sending the power-on password to the HDD to attempt to at least conditionally unlock the HDD; and
   booting a secure O.S. from the HDD if the power-on password at least conditionally unlocks the HDD, wherein the key signal is generated upon initial use of the computer as indication of the user agreeing to register the computer.

9. A method for booting a computer with a secure operating system (O.S.), comprising:
   in lieu of a power-on password, receiving a key signal from an input device operatively connected to the computer;
   in response to the key signal and without further user interaction, executing a basic input output system (BIOS) in the computer to retrieve from a memory associated with the computer the power-on password;
   if a hard disk drive (HDD) associated with the computer is locked with a HDD password, sending the power-on password to the HDD to attempt to at least conditionally unlock the HDD; and
   booting a secure O.S. from the HDD if the power-on password at least conditionally unlocks the HDD, wherein the computer is registered to the user at a vendor facility and the power-on password is set to a random value at the vendor facility, the key signal being generated by the user to reset the power-on password to a user-defined value.

10. A method for booting a computer with a secure operating system (O.S.), comprising:
    in lieu of a power-on password, receiving a key signal from an input device operatively connected to the computer;
    in response to the key signal and without further user interaction, executing a basic input output system (BIOS) in the computer to retrieve from a memory associated with the computer the power-on password;
    if a hard disk drive (HDD) associated with the computer is locked with a HDD password, sending the power-on password to the HDD to attempt to at least conditionally unlock the HDD; and
    booting a secure O.S. from the HDD if the power-on password at least conditionally unlocks the HDD, wherein the power-on password is set to a random value at a vendor facility and a supervisor password associated with the BIOS is set to a registration value at the vendor facility, an attempt to reset the power-on password by generating the key signal and booting the secure O.S. failing, the method then entering a registration mode.

11. A method for booting a computer with a secure operating system (O.S.), comprising:
    in lieu of a power-on password, receiving a key signal from an input device operatively connected to the computer;
    in response to the key signal and without further user interaction, executing a basic input output system (BIOS) in the computer to retrieve from a memory associated with the computer the power-on password;
    if a hard disk drive (HDD) associated with the computer is locked with a HDD password, sending the power-on password to the HDD to attempt to at least conditionally unlock the HDD; and
    booting a secure O.S. from the HDD if the power-on password at least conditionally unlocks the HDD, wherein the power-on password is set to a random value at a vendor facility and a supervisor password associated with the BIOS is cleared at the vendor facility, a registration bit being set to "register" to cause booting of the secure O.S. in a registration mode in response to an initial generation of the key signal by the user.

12. A computer bootable with a secure operating system (O.S.), comprising:
    a key signal generating element on an input device of the computer, the key signal generating element generating a key signal when a user manipulates the key signal generating element once and only once during a basic input output system (BIOS) boot sequence;
    logic implemented on a computer readable medium in the computer for, in response to the key signal and without further user interaction, retrieving from a memory associated in the computer an power-on password;
    logic implemented on a computer readable medium in the computer for sending the power-on password to a hard disk drive (HDD); and
    logic for booting a secure O.S. from the HDD if the power-on password at least conditionally unlocks the HDD.

13. The computer of claim 12, wherein the input element is an "enter" key on a computer keyboard or an "access" key on a computer keyboard.

14. A computer bootable with a secure operating system (O.S.), comprising:
    a key signal generating element on an input device of the computer, the key signal generating element generating a key signal when a user manipulates the key signal generating element once and only once during a basic input output system (BIOS) boot sequence;
    logic implemented on a computer readable medium in the computer for, in response to the key signal and without further user interaction, retrieving from a memory associated in the computer an power-on password;
    logic implemented on a computer readable medium in the computer for sending the power-on password to a hard disk drive (HDD); and
    logic for booting a secure O.S. from the HDD if the power-on password at least conditionally unlocks the HDD, wherein the HDD password is different from the power-on password, and the HDD recognizes the power-on password only for the purpose of granting access to the secure O.S.

15. A computer bootable with a secure operating system (O.S.), comprising:
a key signal generating element on an input device of the computer, the key signal generating element generating a key signal when a user manipulates the key signal generating element once and only once during a basic input output system (BIOS) boot sequence;
logic implemented on a computer readable medium in the computer for, in response to the key signal and without further user interaction, retrieving from a memory associated in the computer an power-on password;
logic implemented on a computer readable medium in the computer for sending the power-on password to a hard disk drive (HDD); and
logic for booting a secure O.S. from the HDD if the power-on password at least conditionally unlocks the HDD, wherein the HDD password is the same as the power-on password, with access to the HDD being granted upon reception of the power-on password.

16. A computer bootable with a secure operating system (O.S.), comprising:
a key signal generating element on an input device of the computer, the key signal generating element generating a key signal when a user manipulates the key signal generating element once and only once during a basic input output system (BIOS) boot sequence;
logic implemented on a computer readable medium in the computer for, in response to the key signal and without further user interaction, retrieving from a memory associated in the computer an power-on password;
logic implemented on a computer readable medium in the computer for sending the power-on password to a hard disk drive (HDD); and
logic for booting a secure O.S. from the HDD if the power-on password at least conditionally unlocks the HDD, wherein if the HDD is not at least conditionally unlocked by the power-on password, logic is executed such that at least one of: an optical disk associated with the computer, or a network associated With the computer, is accessed to obtain a boot copy of the secure O.S.

17. A computer bootable with a secure operating system (O.S.), comprising:
a key signal generating element on an input device of the computer, the key signal generating element generating a key signal when a user manipulates the key signal generating element once and only once during a basic input output system (BIOS) boot sequence;
logic implemented on a computer readable medium in the computer for, in response to the key signal and without further user interaction, retrieving from a memory associated in the computer an power-on password;
logic implemented on a computer readable medium in the computer for sending the power-on password to a hard disk drive (HDD); and
logic for booting a secure O.S. from the HDD if the power-on password at least conditionally unlocks the HDD, wherein die secure O.S. is located on the HDD using at least a logical block address (LBA) in a master boot record (MBR) sector.

18. A computer bootable with a secure operating system (O.S.), comprising:
a key signal generating element on an input device of the computer, the key signal generating element generating a key signal when a user manipulates the key signal generating element once and only once during a basic input output system (BIOS) boot sequence;
logic implemented on a computer readable medium in the computer for, in response to the key signal and without further user interaction, retrieving from a memory associated in the computer an power-on password;
logic implemented on a computer readable medium in the computer for sending the power-on password to a hard disk drive (HDD); and
logic for booting a secure O.S. from the HDD if the power-on password at least conditionally unlocks the HDD, wherein the key signal is generated upon initial use of the computer as indication of the user agreeing to register the computer.

19. A computer bootable with a secure operating system (O.S.), comprising:
a key signal generating element on an input device of the computer, the key signal generating element generating a key signal when a user manipulates the key signal generating element once and only once during a basic input output system (BIOS) boot sequence;
logic implemented on a computer readable medium in the computer for, in response to the key signal and without further user interaction, retrieving from a memory associated in the computer an power-on password;
logic implemented on a computer readable medium in the computer for sending the power-on password to a hard disk drive (HDD); and
logic for booting a secure O.S. from the HDD if the power-on password at least conditionally unlocks the HDD, wherein the computer is registered to the user at a vendor facility and the power-on password is set to a random value at the vendor facility, the key signal being generated by the user to reset the power-on password to a user-defined value.

20. A computer bootable with a secure operating system (O.S.), comprising:
a key signal generating element on an input device of the computer, the key signal generating element generating a key signal when a user manipulates the key signal generating element once and only once during a basic input output system (BIOS) boot sequence;
logic implemented on a computer readable medium in the computer for, in response to the key signal and without further user interaction, retrieving from a memory associated in the computer an power-on password;
logic implemented on a computer readable medium in the computer for sending the power-on password to a hard disk drive (HDD); and
logic for booting a secure O.S. from the HDD if the power-on password at least conditionally unlocks the HDD, wherein the power-on password is set to a random value at a vendor facility and a supervisor password associated with the BIOS is set to a registration value at the vendor facility, an attempt to reset the power-on password by generating the key signal and booting the secure O.S. failing, the method then entering a registration mode.

21. A computer bootable with a secure operating system (O.S.), comprising:
a key signal generating element on an input device of the computer, the key signal generating element generating a key signal when a user manipulates the key signal generating element once and only once during a basic input output system (BIOS) boot sequence;
logic implemented on a computer readable medium in the computer for, in response to the key signal and without further user interaction, retrieving from a memory associated in the computer an power-on password;

logic implemented on a computer readable medium in the computer for sending the power-on password to a hard disk drive (HDD); and logic for booting a secure O.S. from the HDD if the power-on password at least conditionally unlocks the HDD, wherein the power-on password is set to a random value at a vendor facility and a supervisor password associated with the BIOS is cleared at the vendor facility, a registration bit being set to "register" to cause booting of the secure O.S. in a registration mode in response to an initial generation of the key signal by the user.

* * * * *

UNITED STATES PATENT AND TRADEMARK OFFICE
CERTIFICATE OF CORRECTION

PATENT NO. : 7,624,279 B2  Page 1 of 1
APPLICATION NO. : 11/173738
DATED : November 24, 2009
INVENTOR(S) : Davis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1065 days.

Signed and Sealed this

Twenty-sixth Day of October, 2010

David J. Kappos
*Director of the United States Patent and Trademark Office*